March 24, 1959  J. J. PARKER ET AL  2,878,706
CLAMPING ARBOR FOR SPLINES
Filed May 16, 1957
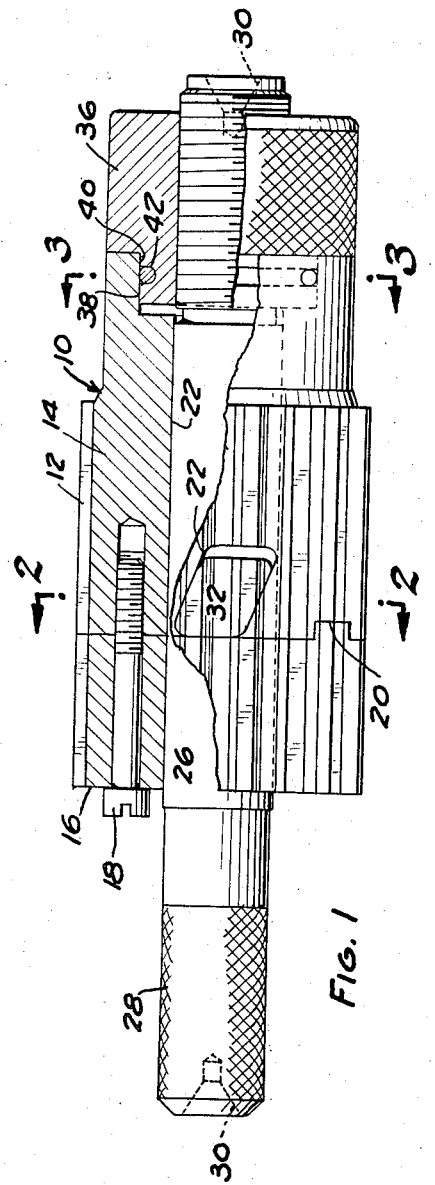
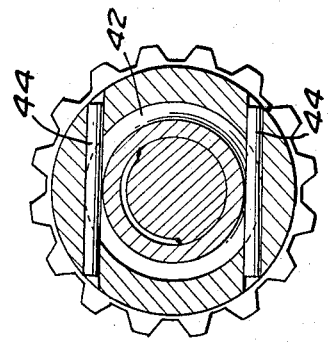
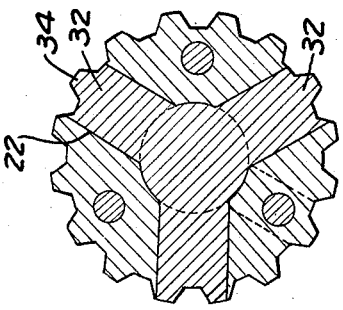
INVENTORS
JOHN J. PARKER & LONDON T. MORAWSKI
BY
ATTORNEYS

United States Patent Office 2,878,706
Patented Mar. 24, 1959

2,878,706

CLAMPING ARBOR FOR SPLINES

John J. Parker and London T. Morawski, Detroit, Mich.

Application May 16, 1957, Serial No. 659,549

5 Claims. (Cl. 82—43)

This invention relates to work-holding devices particularly for work pieces having splines or gear teeth thereon, by engagement with which a work piece is held for performing machining or gaging operations thereon.

The invention is more particularly concerned with a spline arbor or chuck in which opposed counter-torques are exerted upon the side faces of the teeth of a work piece by two relatively movable work-engaging members which have matching teeth that may be moved into and out of alignment. In arbors and chucks of this class, the provision of mechanism for causing relative misalignment of the teeth of the two or more clamping members which engage the work piece involves complicated and expensive motion-converting arrangements and are, furthermore, subject to wear and deflections under load which interfere with the maintenance of accuracy in centering work pieces upon the arbor or chuck.

It is an object of the present invention to provide an improved holder for a splined work piece which may be constructed from a few simple, rugged pieces and in which the use of complex motion-converting arrangements is avoided.

Further objects and advantages of the present invention will be apparent from the following description, reference being had to the accompanying drawing wherein a preferred form of the present invention is illustrated.

In the drawing:

Fig. 1 is a side view partly broken away, showing a preferred form of the present invention.

Fig. 2 is a cross section on line 2—2 of Fig. 1.

Fig. 3 is a cross section on line 3—3 of Fig. 1.

In the embodiment illustrated on the drawing, an annular work-holding member 10 is provided with spline teeth 12 on its outer periphery. The member 10 is formed from two pieces 14 and 16 which are secured together by screws 18 and a tongue and groove 20. Formed in the member 10 is a plurality of slots 22 which extend radially therethrough to the inner bore 24. The slots 22 are formed with helically arranged side walls.

Slideably mounted within the bore 24 is a shaft 26 having a knurl 28 on one end and centers 30 at both ends. The shaft 26 is provided with three radially extending clamping members 32 which extend through the slots 22 and are in slideable engagement with the side walls thereof. Teeth 34 are machined on the ends of members 32 to match the teeth 12 when the members 32 lie adjacent the left end of the slot as shown in Fig. 1. The members 32 are shorter in an axial direction than are the slots 22.

The right hand end of shaft 26 is threaded to receive a nut 36. The latter has a reduced portion 38 telescoped into a counterbore 40 formed at the right hand end of member 10. A groove 42 is formed in the extension 38 and receives pins 44 (see Fig. 3) which form a fork and collar connection between nut 36 and member 10.

In operation, a splined work piece or an internal gear may be slipped over the teeth 12 to a position centralized between their ends while clamping members 32 lie in the left hand end of the slots 22 as shown in Fig. 1. In this position, the teeth 12 on member 10 and the teeth 34 on member 32 are in alignment so that the work piece may be easily slipped across the ends of the clamping members. The nut 36 is then threaded in a direction to draw the shaft 26 to the right, thus pulling the clamping members 32 along the helical side walls of the slots 22. This shifts the teeth 34 out of alignment with the teeth 12 and sets up a clamping action upon the side faces of the teeth of the work piece. This produces counter-acting torques between the teeth 34 and the teeth 12 to tightly clamp the work piece entirely from the side faces of its teeth and thus assures concentricity between the work piece teeth and the arbor teeth.

It will be seen that the present invention provides a work-holding device in which the clamping action is accomplished by the use of only three relatively movable members; namely, an annular toothed member, a radially extending toothed clamping member forming an integral part of a shaft, and a nut for drawing the pieces into clamping position. Furthermore, the camming surfaces which produce the angular displacement between the work-engaging teeth are directly adjacent the teeth themselves and may be made large and strong for maximum effectiveness. This results in a simple, rugged structure which is durable and maintains its accuracy over a long life.

While the form of embodiment of the invention as herein disclosed constitutes a preferred form, it is to be understood that other forms might be adopted, all coming within the scope of the claims which follow.

What is claimed is as follows:

1. A construction for holding a splined work-piece comprising an annular member having spline teeth on its outer periphery, means forming at least one radial slot extending through the annular member substantially midway between the ends of the teeth and having helically disposed side walls, a shaft disposed within the annular member for endwise movement and having an integral radially projecting clamp member extending through said slot, said clamp member having an axial extent less than said slot and teeth matching the teeth on the other member and rockable into and out of alignment therewith by motion endwise of the slot, and means for drawing the shaft and clamp member toward one end of the slot to disalign the teeth and thereby clamp a work-piece by opposed torques exerted upon the side faces of its teeth.

2. A construction for holding a splined work-piece comprising an annular member having spline teeth on its outer periphery, means forming at least one radial slot extending through the annular member substantially midway between the ends of the teeth and having helically disposed side walls, a shaft disposed within the annular member for endwise movement and having integral radially projecting clamp member extending through said slot, said clamp member having an axial extent less than said slot and teeth matching the teeth on the other member and rockable into and out of alignment therewith by motion endwise of the slot, and means for drawing the shaft and clamp member toward one end of the slot to disalign the teeth and thereby clamp a work-piece by opposed torques exerted upon the side faces of its teeth, the shaft and the clamping member constituting an integral piece of metal.

3. A construction for holding a splined work-piece comprising an annular member having splined teeth on its outer periphery, means forming at least one radial slot extending through the annular member substantially midway between the ends of the teeth and having helically disposed side walls, a shaft disposed within the annular member for endwise movement and having an integral radially projecting clamp member extending through said slot, said clamp member having an axial extent less than said slot and teeth matching the teeth on the other member and rockable into and out of alignment therewith by motion endwise of the slot, and means for drawing the shaft and clamp member toward one end of the slot to disalign the teeth and thereby clamp a work-piece by opposed torques exerted upon the side faces of its teeth, said means comprising a nut threaded on the shaft and rotatably but non-slidably secured to the annular member.

4. A construction for holding a splined work-piece comprising an annular member having spline teeth on its outer periphery, means forming at least one radial slot extending through the annular member substantially midway between the ends of the teeth and having helically disposed side walls, a shaft disposed within the annular member for endwise movement and having an integral radially projecting clamp member extending through said slot, said clamp member having an axial extent less than said slot and teeth matching the teeth on the other member and rockable into and out of alignment therewith by motion endwise of the slot, and means for drawing the shaft and clamp member toward one end of the slot to disalign the teeth and thereby clamp a work-piece by opposed torques exerted upon the side faces of its teeth, said means comprising a nut threaded on the shaft at one end thereof and telescopically related to the annular member and means forming a fork-and-collar connection between the nut and the annular member.

5. A construction for holding a splined work-piece comprising a stationary work-engaging member having a set of axially extending work-engaging teeth distributed around a circle in an interrupted pattern, a rockable work-engaging member having work-engaging teeth distributed around the same circle in the interrupted portions of the pattern, mating helical cam means formed upon each member at said interrupted portions of the pattern directly adjacent the circle of teeth and means for producing endwise relative movement of the members whereby to cause angular displacement of the members whereby the teeth of a work-piece may be subjected to counteracting torques applied against the side faces of the teeth.

References Cited in the file of this patent

UNITED STATES PATENTS

| | | |
|---|---|---|
| 2,445,184 | Parker et al. | July 13, 1948 |
| 2,665,136 | Fallon | Jan. 5, 1954 |
| 2,762,629 | Dalby | Sept. 11, 1956 |
| 2,805,864 | Parker et al. | Sept. 10, 1957 |